UNITED STATES PATENT OFFICE.

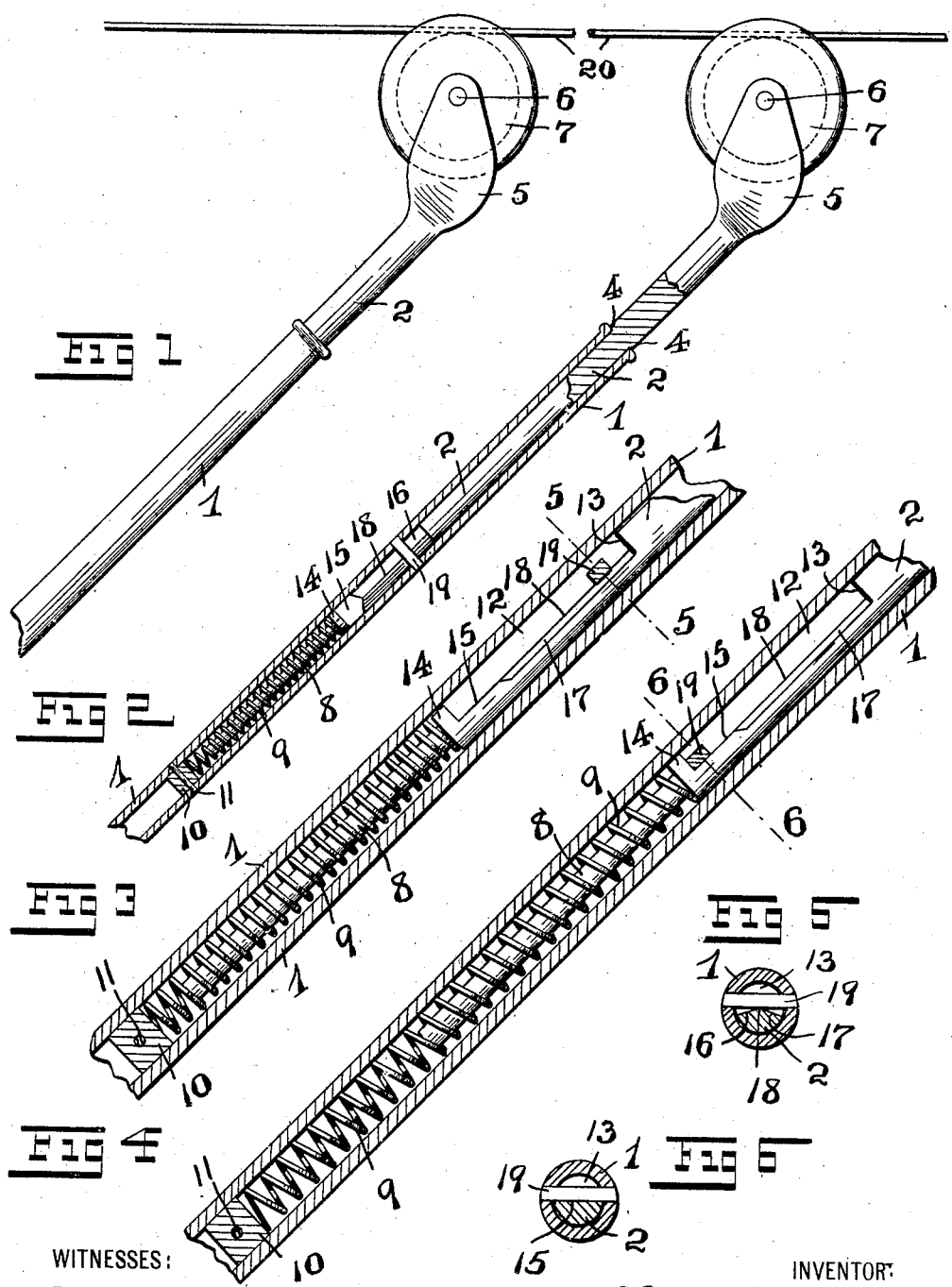

HARRY BENNETT, OF NEWARK, NEW JERSEY, ASSIGNOR TO THE BENNETT INVENTING AND MANUFACTURING COMPANY, A CORPORATION OF NEW JERSEY.

TROLLEY FOR ELECTRIC RAILWAYS.

No. 858,255.  Specification of Letters Patent.  Patented June 25, 1907.

Application filed April 17, 1906. Serial No. 312,102.

*To all whom it may concern:*

Be it known that I, HARRY BENNETT, a citizen of the United States, residing at Newark, in the county of Essex and State of New Jersey, have invented certain new and useful Improvements in Trolleys for Electric Railways; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has reference, generally, to improvements in trolley-wheels for electric railways; and, the invention has for its principal object to provide a simply constructed trolley-wheel carrier adapted to be connected with the usual tubular trolley-pole upon a car, all constructed and arranged with a view for positively controlling the position of the trolley-wheel in its rolling contact with the trolley-wire, and to prevent the displacement of the wheel from the wire, irrespective of any irregular motion of the trolley-pole proper, produced by the uneven movements of the car, or when passing over switches, turn-outs, or cross-overs in the lines of wire, and any other inaccuracies that may exist.

A still further object of this invention is to provide a means for preventing oscillatory or side movements of the trolley-wheel with relation to the trolley-pole, when the wheel is off the wire, so as to perfectly fix or center the wheel for readily placing it in contact with the trolley-wire; but, the wheel when in such contact with the wire, aside from its rolling motion, having also an oscillatory or side or lateral movement, to either side of a vertical plane through the central axis of the trolley-pole, thus producing a simple means which prevents the accidental displacement of the trolley-wheel from the wire, and at the same time dispenses with the use of the long guard-arms or fingers, or other similar and cumbersome means, now ordinarily employed.

Other objects of this invention not at this time more particularly mentioned, will be clearly understood from the following description of my present invention.

The invention consists therefore in the novel construction of trolley-wheel carrier hereinafter more fully set forth; and, furthermore, the invention consists in the various details of the construction of the same, all of which will be hereinafter more fully set forth and then finally embodied in the clauses of the claims which are appended to and which form an essential part of this specification.

The invention is illustrated in the accompany drawings, in which:—

Figure 1 is a side elevation of the trolley-wheel and carrier embodying the principles of my present invention, showing the same operatively connected with the upper portion of the tubular trolley-pole; and Fig. 2 is a similar view of said parts, but the said portion of the trolley pole being represented in longitudinal section. Fig. 3 is a horizontal sectional representation, upon an enlarged scale, of a portion of the wheel-carrier and trolley-pole, representing the relative positions of the said parts when the trolley-wheel is against the trolley-wire; and Fig. 4 is a similar sectional representation of the said parts, showing the position of the parts when the trolley-wheel is off the wire. Fig. 5 is cross-section taken on line 5—5 in said Fig. 3; and Fig. 6 is a similar section taken on line 6—6 in said Fig. 4 of the drawings.

Similar characters of reference are employed in all of the said above described views, to indicate corresponding parts.

Referring now to the several figures of the drawings, the reference-character 1 indicates the usual tubular trolley-pole or support which is secured at its lower end upon the roof of a car, and has operatively connected with its upper end-portion the trolley-wheel carrier which embodies the principles of my present invention. The said trolley-wheel carrier comprises a carrier-rod or shank 2 which is inserted in the tubular end-portion 3 of the said trolley-pole or support, said rod or shank 2 having a shoulder 4 substantially as shown. At its upper end-portion, the said carrier-rod or shank 2 has integrally connected therewith a wheel-carrying harp or bearing 5 of any suitable shape, which is provided with a pin 6, upon which is rotatively arranged the usual trolley-wheel 7. Extending downwardly from the lower end-portion of the said rod or shank 2, which end-portion is slidably arranged within the tubular end-portion 3 of the said trolley-pole or support 1, is a rod or stem 8 which is encircled by a spring 9, the lower end-portion of which extends beyond the lower end of the said rod or stem 8 and engages with a nut or collar 10 which is secured within the said trolley-pole or support in a fixed position by means of a pin 11, or other suitable fastening means, as will be clearly understood.

From an inspection of the several figures of the drawings, it will be seen that the rod or shank 2 is provided with a comparatively long cutaway or recessed portion 12 formed at its upper and lower ends respectively with the shoulders 13 and 14. Contiguous to the said lower shoulder 14, the said recessed portion 12 is made with a flat surface 15, and extending from the upper edge of said flat surface 15 to the upper shoulder 13 are two narrow flat faces 16 and 17, which taper downwardly upon opposite sides of the longitudinally extending ridge or apex 18 of the two faces 16 and 17, as clearly illustrated in Figs. 2 and 5 of the drawings. From an inspection of Figs. 3 and 4 it will be seen that the plane of the upper flat face or surface 15 lies in the same plane passing through the said ridge or apex 18, whereby a continuous and unbroken line will be the result, as clearly shown. Extending laterally across the said recessed portion 12, is a pin 19, said pin being of a square or rectangular cross-section, and having its ends permanently secured in the opposite sides of the said tubular trolley-rod or support 1, substantially as shown in Fig. 2 of the drawings. From an inspection of Figs. 2, 3 and 4 of the drawings it will be seen, that the said carrier-rod or shank 2, and the parts connected therewith, are capable of a reciprocatory motion, which is regulated by the length of the said recessed part 12 and the pin or bar 19, the said spring 9 under normal conditions when the trolley-wheel 7 is in rolling contact with the trolley-wire 20, being suitably compressed, that it will result in the said trolley-wheel 7 being retained in its rolling engagement with the under surface of the said wire. At the same time, the said pin or rod 19 rides directly upon the sharp ridge or apex 18 thus permitting the said rod or shank 2, and the trolley-wheel to have sufficient rotary motion, that the trolley-wheel will accommodate itself to any inequalities in the line wire, or any uneven movements of the car and the trolley-pole or support 1, without the least danger of the said trolley-wheel running from its rolling contact with the wire 20. That the said trolley-wheel 7 may be rigidly retained against any oscillatory movement to either side, when removed from its rolling contact with the wire 20, it will be seen that the spring 9 will force the parts in the various positions indicated in Fig. 4 of the drawings. This causes the lower flat surface of the pin or rod 19 to ride directly upon the flat surface 15, thereby locking the said rod or shank 2 and its parts against any possible rotary or oscillatory motion, whereby the said trolley-wheel is positively held in its centered relation. It will thus be evident, that this centered relation of the trolley-wheel 7 will enable the operator to quickly and easily replace the trolley-wheel upon the under surface of the trolley-wire, thereby causing the parts to again assume their relative positions shown in Figs. 2 and 3 of the drawings, with the said pin or rod 19 again arranged directly across the thin and sharp ridge or apex 18, whereby the slight rotary or oscillatory movements of the parts are permitted, to constantly retain the trolley-wheel 7 against the trolley-wire 20, when the car is running. The trolley-wheel will therefore always run in perfect alinement upon the wire, without the least danger of becoming displaced from its operative rolling contact or engagement with the said trolley wire.

I claim:—

1. In a trolley for electric railways, the combination, with a tubular trolley-pole, of a carrier-rod having a longitudinally extending open or recessed portion, said portion being provided with a flat face and a pair of angularly arranged surfaces, said angularly arranged surfaces terminating in a sharp ridge or apex, the said ridge or apex and said flat face being located in the same plane, and a pin connected with the trolley-pole and extending across the said open or recessed portion of a carrier-rod, said pin being slidable longitudinally upon said ridge or apex and upon said flat-face, substantially as and for the purposes set forth.

2. In a trolley for electric railways, the combination, with a tubular trolley-pole, of a carrier-rod having a longitudinally extending open or recessed portion, said portion being provided with a flat face and a pair of angularly arranged surfaces, said angularly arranged surfaces terminating in a sharp ridge or apex, the said ridge or apex and said flat face being located in the same plane, and a pin connected with the trolley-pole and extending across the said open or recessed portion of the carrier-rod, said pin being slidable longitudinally upon said ridge or apex and upon said flat-face, a fixed stop in said tubular trolley-pole and a spring in said trolley-pole between the said stop and the lower end-portion of said carrier-rod, substantially as and for the purposes set forth.

3. In a trolley for electric railways, the combination, with a tubular trolley-pole, of a carrier-rod having a longitudinally extending open or recessed portion, said portion being provided with a flat face and a pair of angularly arranged surfaces, said angularly arranged surfaces terminating in a sharp ridge or apex, said ridge or apex and said flat face being located in the same plane, and a pin connected with the trolley-pole and extending across the said open or recessed portion of the carrier-rod, said pin being slidable longitudinally upon said ridge or apex and upon said flat face, a fixed stop in said tubular trolley-pole, a stem extending upon the lower end-portion of said carrier-rod terminating at a point near said fixed stop, and a spring in said trolley-pole encircling the said stem and having its lower end in engagement with said stop and its upper end in engagement with a portion of said carrier-rod, substantially as and for the purposes set forth.

4. In a trolley for electric railways, the combination, with a tubular trolley-pole, of a carrier-rod having a shoulder-portion 4 and a trolley-harp at its upper end integrally connected with said carrier-rod, said carrier-rod being provided with a longitudinally extending open or recessed portion, formed with shoulders 13 and 14 at its opposite ends, said portion being provided with a flat face 15 extending from said shoulder 14, and a pair of angularly arranged surfaces 16 and 17 between the upper edge of said flat face 15 and the shoulder 13, said surfaces terminating in a sharp ridge or apex 18, the said ridge or apex of said flat face 15 being located in the same plane, and a pin connected with the trolley-pole and extending across the said open or recessed portion of the carrier-rod, said pin being slidable longitudinally upon said ridge or apex and upon the flat face 15, substantially as and for the purposes set forth.

5. In a trolley for electric railways, the combination, with a tubular trolley-pole, of a carrier-rod having a shoulder-portion 4 and a trolley-harp at its upper end integrally connected with said carrier-rod, said carrier-rod being provided with a longitudinally extending open or recessed portion formed with shoulders 13 and 14 at its opposite ends, said portion being provided with a flat face 15 extending from said shoulder 14, and a pair of angularly arranged surfaces 16 and 17 between the upper edge of said flat face 15 and the shoulder 13, said surfaces terminating in a sharp ridge or apex 18, the said ridge or apex and said flat face 15 being located in the same plane, and a pin connected with the trolley-pole and extending across the said open or recessed portion of the carrier-rod, said pin being slidable longitudinally upon said ridge or apex and upon the flat face 15, a fixed stop in said tubular trolley-pole, and a spring in said trolley-pole between the said stop and the lower end portion of said carrier-rod, substantially as and for the purposes set forth.

6. In a trolley for electric railways, the combination, with a tubular trolley-pole, of a carrier-rod having a shoulder-portion 4 and a trolley-harp at its upper end integrally connected with said carrier-rod, said carrier-rod being provided with a longitudinally extending open or recessed portion, formed with shoulders 13 and 14 at its opposite ends, said portion being provided with a flat face 15 extending from said shoulder 14, and a pair of angularly arranged surfaces 16 and 17 between the upper edge of said flat face 15 and the shoulder 13, said surfaces terminating in a sharp ridge or apex 18, the said ridge or apex and said flat face 15 being located in the same plane, and a pin connected with a trolley-pole and extending across the said open or recessed portion of the carrier-rod, said pin being slidable longitudinally upon said ridge or apex and upon the flat face 15, a fixed stop in said tubular trolley-pole, a stem extending from the lower end portion of said carrier-rod terminating in a point near said fixed stop, and a spring in said trolley-pole encircling the said stem and having its lower end in engagement with said stop, and its upper end in engagement with a portion of said carrier-rod, substantially as and for the purposes set forth.

In testimony, that I claim the invention set forth above I have hereunto set my hand this 30th day of March, 1906.

HARRY BENNETT.

Witnesses:
    FREDK. C. FRAENTZEL,
    GEO. D. RICHARDS.